United States Patent [19]

Finkelstein et al.

[11] 4,245,278

[45] Jan. 13, 1981

[54] ELECTROLYTIC CAPACITOR CONTAINING A METATUNGSTATE ELECTROLYTE

[75] Inventors: Manuel Finkelstein, North Adams; Franz S. Dunkl; Sidney D. Ross, both of Williamstown, all of Mass.

[73] Assignee: Sprague Electric Company, North Adams, Mass.

[21] Appl. No.: 22,551

[22] Filed: Mar. 21, 1979

[51] Int. Cl.$^3$ .............................................. H01G 9/02
[52] U.S. Cl. .................................... 361/433; 252/62.2
[58] Field of Search ....................... 252/62.2; 361/433

[56] References Cited

U.S. PATENT DOCUMENTS

| | | | |
|---|---|---|---|
| 3,502,947 | 3/1970 | Hand | 252/62.2 X |
| 3,547,423 | 12/1970 | Jenny et al. | 361/433 |
| 3,909,682 | 9/1975 | Dunkl et al. | 252/62.2 X |
| 3,931,552 | 1/1976 | Anderson et al. | 252/62.2 X |
| 4,031,436 | 6/1977 | Alwitt | 252/62.2 X |

*Primary Examiner*—Jack Cooper
*Attorney, Agent, or Firm*—Connolly and Hutz

[57] ABSTRACT

An electrolytic capacitor contains as electrolyte a metatungstate salt dissolved in a polar solvent. The salt is preferably an ammonium or amine salt, and the solvent consists essentially of at least one polar organic solvent and water.

11 Claims, 2 Drawing Figures

ELECTROLYTIC CAPACITOR CONTAINING A METATUNGSTATE ELECTROLYTE

BACKGROUND OF THE INVENTION

This invention pertains to an electrolytic capacitor containing an electrolyte of a metatungstate salt dissolved in a polar solvent. More particularly it pertains to a low-voltage capacitor that retains at least 70% capacity at −40° C.

Low voltage (0-35 V) capacitors generally find use at −40° C. to 85° C. It is desirable that they retain at least 70% capacity at −40° C. Because of the −40° C. operating requirement, water can not be used as a sole solvent. Some water must be present, however, for the reformation of oxide during operation as water is generally the source of oxygen for this reformation.

Ethylene glycol has been used with water to form mixtures that will not freeze, e.g., automotive antifreeze. Other polar organic solvents will also form such mixtures. In addition to this, it is desirable that the solvent system permits adequate conduction of the solute ions, particularly at low temperatures, and this generally requires a relatively low solvent viscosity at low temperatures.

SUMMARY OF THE INVENTION

A feature of this invention is the provision of a capacitor that is useful at low voltages and low temperatures and contains a metatungstate salt electrolyte.

Another feature of the invention is the provision of a capacitor useful at low voltages that retains at least 70% of its capacity at −40° C.

Another feature of the invention is the provision of an electrolyte which can be used in low, intermediate, and high-voltage capacitors.

These features are attained by the use in an electrolytic capacitor of a metatungstate salt dissolved in a polar solvent. If the capacitor is an aluminum one, some water must be present. Therefore, the solvent must be able to dissolve small amounts of water. For low voltage, low temperature capacitors, the solvent should also have a low viscosity at −40° C. and, of course, be capable of dissociating the solute at that temperature to provide the desired ionic conduction. Ethers, polyols, lactones, amides, sulfoxides, and oxazolidones are classes of solvents that are useful, but other polar solvents compatible with capacitor materials and in which the metatungstate solute is soluble can be used. Specific examples include dimethylformamide (DMF), ethylene glycol, 4-butyrolactone, 1,2-propanediol, methyl cellosolve, methyl carbitol, 3-ethyl-2-oxazolidone, and dimethylsulfoxide. Mixtures of such solvents may be used also.

Capacitor construction materials also determine solvent choice. Some solvents, e.g., DMF, are harder to contain than others, and more expensive materials must be used, for example for bungs, to contain them. The metatungstate solute dissociates well enough that solvents that are easier to contain but that have a higher viscosity, glycol for example, can be used and still obtain the desired low-temperature characteristics.

Thus, an electrolytic capacitor for low-voltage, low-temperature operation contains a metatungstate, preferably in the form of an ammonium or amine salt, dissolved in a polar solvent containing some water. Some such polar solvents are ethylene glycol, N,N-dimethylformamide, 4-butyrolactone, 1,2-propanediol, methyl carbitol, methyl cellosolve, 3-ethyl-2-oxazolidone, and/or dimethylsulfoxide.

BRIEF DESCRIPTION OF THE DRAWING

Referring to FIG. 1, wound capacitor section 10 consists of anode foil 11 of a valve metal, preferably aluminum, having on its surface an insulting oxide barrier layer. Cathode foil 13 may also be a valve metal. Electrolyte absorbent films 12 and 14, preferably paper, are positioned between the anode and cathode foils. Tabs 15 and 16 are connected to electrodes 11 and 13, respectively, to provide for connection of the electrodes to leads. When completely wound, section 10 is impregnated with electrolyte (not shown).

FIG. 2 shows a cross-section of an axial capacitor in which the cathode tape 16 of capacitor section 10 is welded at 22 to the bottom of container 25 and it in turn is welded at 23 to cathode lead 24. Anode tab 15 is welded to the bottom portion 17 of plug 18 positioned in bushing 19, and plug 18 is welded at 20 to anode lead 21. Electrolyte (not shown) impregnates section 10.

DESCRIPTION OF THE PREFERRED EMBODIMENTS

Figure 1:
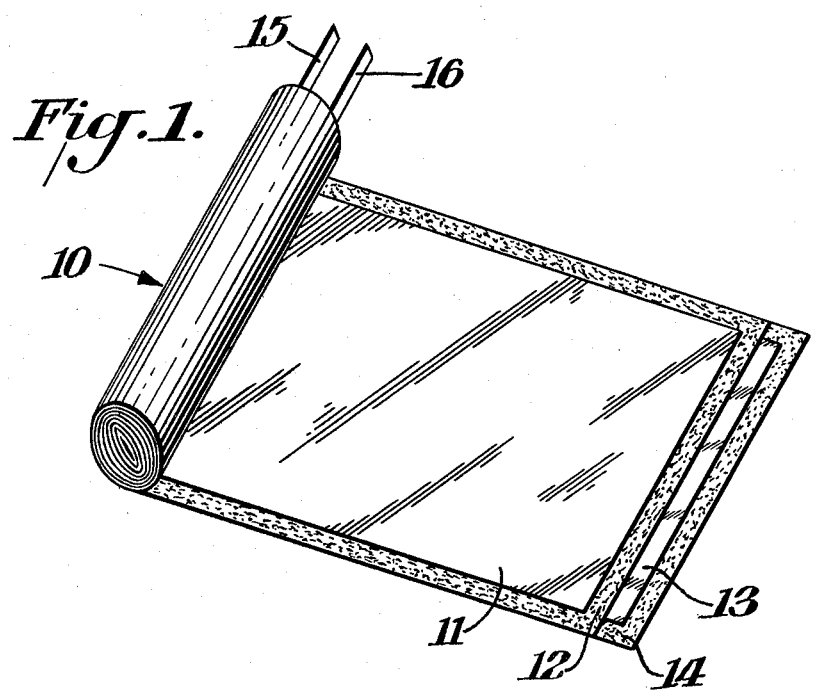
FIG. 1 shows a wound capacitor section partially unrolled.
Figure 2:
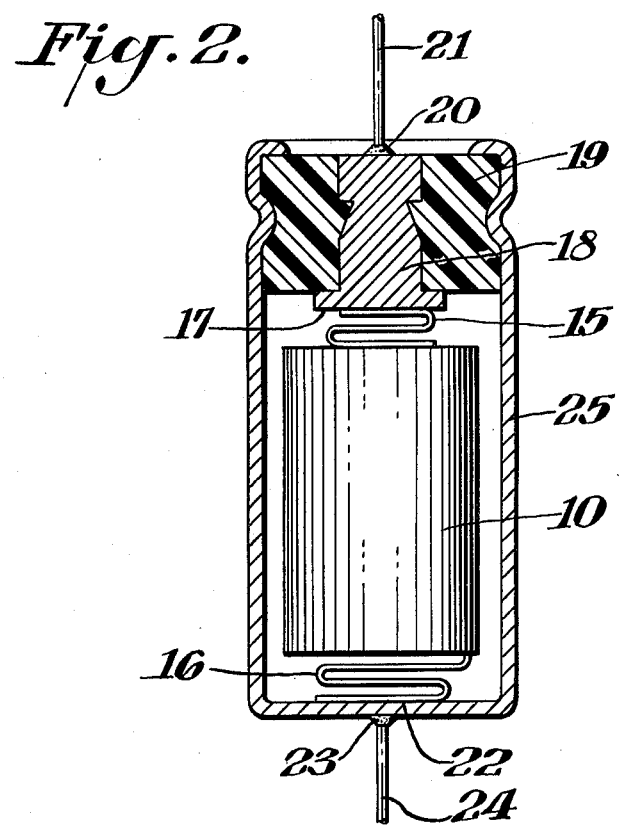
FIG. 2 is a cross-section of a capacitor containing a wound section.

In the first example, ammonium metatungstate (AMT) is the solute in a glycol-water solvent. In the following tables, all amounts are in weight-percent, and resistivity in ohm-cm.

TABLE 1

| Formulation No. | AMT | Glycol | Water | Resistivity 25° C. | Resistivity −40° C. |
|---|---|---|---|---|---|
| 1 | 27.5 | 61.5 | 11.0 | 270 | 21,680 |
| 2 | 28.4 | 52.7 | 18.9 | 146 | — |
| 3 | 30.2 | 48.3 | 21.5 | 116 | 6,534 |
| 4 | 43.2 | 48.1 | 8.7 | 177 | 19,328 |
| 5 | 43.5 | 36.5 | 20.0 | 70 | 4,000 |

Formulation 3 had a maximum formation voltage for aluminum of 160 V at 25° C. After heating for 67 hrs at 85° C., its 25° C. resistivity was unchanged; after 138 hrs. at 85° C., the 25° C. resistivity was 125 ohm-cm. Formulation 5 had a maximum formation voltage of 90 V at 25° C. for aluminum and also forms tantalum to 85 V. After heating for 121.5 hrs at 85° C., the resistivity was 69 ohm-cm, virtually unchanged, and after 288.5 hrs, it was still 69 ohm-cm. Thus, the electrolyte remains stable with heating to capacitor operating temperatures.

Formulations 3 and 5 were used in sandwich test capacitors to measure loss of capacitance at −40° C. The aluminum anode foil had been anodized to 10 V, and manila paper was used as the spacer. Three different aluminum cathode foils were used, a high-quality one (A) and two of regular quality, one of which had a 2 V formation (B) and one of which was unformed (C).

TABLE 2

| Capacitor | Cap. loss, %, #3 | Cap. loss, %, #5 |
|---|---|---|
| A | 19.2 | 15.1 |
| B | 26.8 | 20.6 |
| C | 28.5 | 26.3 |

Both formulations met the 70% capacitance retention (less than 30% loss) at −40° C. Formulation #3 was used in test capacitors and aged at 85° C.; the results are given in Table 3 for foil arrangements as in A and C above.

TABLE 3

|   | Cap., μF | | | DF | | ESR | | Z,120Hz | | Z Ratio |
|---|---|---|---|---|---|---|---|---|---|---|
|   | 25° C. | −40° C. | % Δ Cap | 25° C. | −40° C. | 25° C. | −40° C. | 25° C. | −40° C. | −40°/25° C. |
| A | 89.07 | 65.20 | 26.8 | 0.092 | 1.42 | 1.37 | 28.9 | 15.0 | 35.3 | 2.4 |
| C | 70.42 | 48.72 | 30.8 | 0.116 | 1.20 | 2.18 | 32.7 | 19.0 | 42.5 | 2.2 |

Capacitance change was in the same order as in the sandwich capacitors.

EXAMPLE 2

This example shows ammonium metatungstate (AMT) in a butyrolactone (BLO)-ethylene glycol-water solvent for low-voltage use. Composition is given in weight-percent and resistivity in ohm-cm.

TABLE 4

AMT in Butyrolatone (BLO) - Glycol - Water for Low-Voltage Use

| AMT | BLO | Glycol | H₂O | Resistivity 25° C. | −40° C. |
|---|---|---|---|---|---|
| 35 | 47.1 | 13 | 5 | 222 | 7006 |
| 35 | 36 | 24 | 5 | 218 | 8456 |
| 28.7 | 45.9 | 20.5 | 4.9 | 263 | 7550 |
| 24.6 | 55.7 | 14.8 | 4.9 | 324 | 7580 |
| 29 | 52.5 | 13.9 | 4.6 | 283 | 7037 |
| 37.8 | 35.7 | 23.8 | 2.7 | 254 | |
| 43.9 | 32.2 | 21.5 | 2.4 | 229 | |
| 42.9 | 31.4 | 21.0 | 4.7 | 171 | |
| 47.8 | 28.7 | 19.1 | 4.4 | 165 | |

The first 3 formulations had maximum formation voltages of 114, 110, and 112V at 25° C., respectively.

EXAMPLE 3

By adjusting the resistivity to above 600Ω-cm, an electrolyte suitable for intermediate-voltage use can be obtained. Data for two representative samples are given in Tables 5 and 6. Again composition is in weight-percent and resistivity in ohm-cm.

TABLE 5

AMT in Glycol-Water for Intermediate-Voltage Use

| AMT | Glycol | Water | Resistivity, 25° C. | Max. Formation Voltage, 25° C. |
|---|---|---|---|---|
| 14.7 | 81.6 | 3.7 | 936 | 190 |
| 20.6 | 76.0 | 3.4 | 645 | 150 |

The data above and that of Example 1 show the utility of a solution of ammonium metatungstate in ethylene glycol containing water. The preferred amounts are 14 to 50 wt % ammonium metatungstate, 36 to 83 wt % ethylene glycol, and 3 to 22 wt % water.

TABLE 6

AMT in Ethylene Glycol-1,2-Propandiol (PG) - Water Solvent

| AMT | Glycol | PG | H₂O | Resistivity, 25° C. |
|---|---|---|---|---|
| 30.7 | 34.4 | 31.9 | 3.0 | 932 |
| 30.3 | 53.9 | 12.7 | 3.1 | 545 |
| 30.3 | 60.6 | 6.1 | 3.0 | 483 |
| 30.5 | 47.6 | 18.9 | 3.0 | 645 |
| 30.5 | 40.9 | 25.6 | 3.0 | 740 |

The last formulation had a maximum formation voltage at 25° C. of 114 V.

EXAMPLE 4

High-voltage capacitors can be made using ammonium metatungstate as the resistivities in the following table shows by choice or appropriate solvents. Composition is in weight-percent and resistivity in ohm-cm. Formulation 4 showed the best high voltage results.

TABLE 7

AMT in Dimethylformamide (DMF) - Water Solvent

| AMT | DMF | H₂O | Resistivity, 25° C. |
|---|---|---|---|
| 33.6 | 63.1 | 3.3 | 191 |
| 9.1 | 86.3 | 4.6 | 510 |
| 6.4 | 90.4 | 3.2 | 695 |
| 5.7 | 93.4 | 0.9 | 822 |
| 38.3 | 57.9 | 3.8 | 193 |
| 24.3 | 73.3 | 2.4 | 284 |

The maximum formation voltages at 25° C. for the last 3 formulations were 330, 110, and 160 V, respectively.

The preferred amounts of ammonium metatungstate, DMF, and water are 5 to 40 wt % ammonium metatungstate, 56 to 94 wt % DMF, and 1 to 5 wt % water.

EXAMPLE 5

This example shows the preparation and evaluation of two amine metatungstate salts, the piperidinium and diethylammonium metatungstates.

Piperidine (20 ml) was added to an aqueous solution of ammonium metatungstate (20 g in 50 ml H₂O) while stirring. A white precipitate formed with the evolution of heat. Acetone (125 ml) was added, and the mixture was cooled and filtered to yield an air-dried white powder, piperidinium metatungstate. It showed no infrared absorption at 7.13μ, characteristic of the ammonium cation. Two formulations were made and evaluated.

|   | Formulation 1 | Formulation 2 |
|---|---|---|
| Piperidinium metatungstate | 7.15g | 20g |
| Dimethylformamide | 80 ml | — |
| Ethylene glycol | 22 ml | 20 ml |
| 3-Ethyl-2-oxazolidone | 20 ml | 50 ml |
| Water | 5 ml | 2 ml |
| Resistivity, ohm-cm | 1667 | 939 |
| Max. formation voltage, 25° C. | 325V | 140V |

Diethylamine (50 ml) was added to an aqueous solution of ammonium metatungstate (50 g in 50 ml H₂O) while stirring. Acetone (300 ml) was added, and the mixture cooled in an ice-bath, and filtered. The infrared spectrum of the product, diethylammonium metatungstate, showed the ammonium ion was absent. This salt was evaluated in the following four formulations.

|   | 1 | 2 | 3 | 4 |
|---|---|---|---|---|
| Diethylammonium metatungstate | 15g | 30g | 5g | 30g |
| Ethylene glycol | 10ml | 34.1g | 10ml | 61.1g |
| Butyrolactone | 10ml | 35.2g | 2ml | 10.9g |
| Water | 1ml | 3g | 0.5ml | 5g |

-continued

| | 1 | 2 | 3 | 4 |
|---|---|---|---|---|
| Resistivity, ohm-cm | 474 | 543 | 543 | 482 |

Formulations 2 and 4 had maximum formation voltages at 25° C. of 120 V and 118 V, respectively.

Other amine salts may be prepared similarly to the heterocyclic and alkyl compounds above.

EXAMPLE 6

This example shows the improved results that can be obtained by using a mixture of polar solvents. All mixtures contained 5 g ammonium metatungstate and 0.5 ml water in 10 ml solvent. The solvent composition is in volume percent, and resistivity is in ohm-cm at 25° C.

| Glycol | Butyrolactone | Resistivity |
|---|---|---|
| 100 | 0 | 457 |
| 80 | 20 | 381 |
| 70 | 30 | 356 |
| 60 | 40 | 322 |
| 50 | 50 | 330 |
| 40 | 60 | 325 |
| 30 | 70 | 330 |
| 20 | 80 | 338 |
| 15 | 85 | 356 |
| 10 | 90 | 362 |

The data above and that in Table 4 show the utility of a solution of ammonium metatungstate in an ethylene glycol-butyrolactone-water solvent mixture. The preferred amounts are 24 to 48 wt % ammonium metatungstate, 6 to 67 wt % ethylene glycol, 0 to 61 wt % butyrolactone, and 2 to 5 wt % water.

| Dimethylsulfoxide | Methyl Carbitol | Resistivity |
|---|---|---|
| 0 | 100 | 1560 |
| 20 | 80 | 811 |
| 40 | 60 | 578 |
| 50 | 50 | 495 |
| 60 | 40 | 437 |
| 80 | 20 | 279 |
| 90 | 10 | 237 |
| 100 | 0 | 237 |

Thus, by appropriate choice of solvent or solvent mixtures, it is possible to vary electrolyte properties and therefore the range of capacitor operation.

These electrolytes may be used in all-aluminum, tantalum-aluminum, and all-tantalum capacitors for low, intermediate, and high-voltage products.

What is claimed is:

1. An electrolytic capacitor that retains at least 70% capacity at 40° C. comprising two electrodes at least one of said electrodes having a thin barrier layer dielectric oxide on the surface thereof, and as electrolyte in contact with said electrodes a solution of a metatungstate salt in a polar organic solvent containing 1 to 22 wt percent water.

2. An electrolytic capacitor according to claim 1 wherein said metatungstate salt is an ammonium or amine salt.

3. An electrolytic capacitor according to claim 2 wherein said metatungstate salt is ammonium metatungstate.

4. An electrolytic capacitor according to claim 2 wherein said metatungstate salt is diethylammonium metatungstate.

5. An electrolytic capacitor according to claim 2 wherein said metatungstate salt is piperidinium metatungstate.

6. An electrolytic capacitor according to claim 1 wherein said polar organic solvent is chosen from the group consisting of amides, glycols, lactones, oxazolidones, carbitols, diols, sulfoxides, and mixtures thereof.

7. An electrolytic capacitor according to claim 6 wherein said polar organic solvent is chosen from the group consisting of ethylene glycol, dimethylformamide, butyrolactone, 3-ethyl-2-oxazolidone, methyl carbitol, 1,2-propanediol, dimethylsulfoxide, and mixtures thereof.

8. An electrolytic capacitor according to claim 7 wherein said salt is ammonium metatungstate, said polar organic solvent is ethylene glycol, the amount of said metatungstate is in the range of 14 to 50 weight-percent, the amount of said glycol is in the range of 36 to 83 weight-percent, and the amount of said water is in the range of 3 to 22 weight-percent.

9. An electrolyte capacitor according to claim 7 wherein said salt is ammonium metatungstate, said polar organic solvent is an ethylene glycol-gamma-butyrolactone mixture, the amount of said metatungstate is in the range of 24 to 48 weight-percent, the amount of ethylene glycol is in the range of 6 to 67 weight-percent, the amount of butyrolactone is in the range of 0 to 61 weight-percent, and the amount of water is in the range of 2 to 5 weight-percent.

10. An electrolytic capacitor according to claim 7 wherein said salt is ammonium metatungstate, said polar organic solvent is N,N-dimethylformamide, the amount of metatungstate is in the range of 5 to 40 weight-percent, the amount of dimethylformamide is 56 to 94 weight-percent, and the amount of water is about 1 weight-percent to 5 weight-percent.

11. An electrolytic capacitor according to claim 1 wherein said electrode foils are aluminum foils.

* * * * *

UNITED STATES PATENT OFFICE
CERTIFICATE OF CORRECTION

Patent No. 4,245,278     Dated January 13, 1981

Inventor(s) Manuel Finkelstein et al

It is certified that error appears in the above-identified patent and that said Letters Patent are hereby corrected as shown below:

Column 2, line 11, "insulting" should read -- insulating --
Column 2, line 20, "tape" should read -- tab --
Column 4, line 5, "or" should read -- of --
Claim 1, line 2 (Column 6, line 2), "40°C" should
      read -- -40°C --
Claim 9, line 1 (Column 6, line 37), "electrolyte" should
      read -- electrolytic --

*Signed and Sealed this*

*Seventh* Day of *April 1981*

[SEAL]

*Attest:*

RENE D. TEGTMEYER

*Attesting Officer*     *Acting Commissioner of Patents and Trademarks*